(12) United States Patent
Chen et al.

(10) Patent No.: US 10,724,490 B2
(45) Date of Patent: Jul. 28, 2020

(54) SYSTEM AND METHODS FOR CONTROLLING A STOP/START ENGINE

(71) Applicant: Ford Global Technologies, LLC, Dearborn, MI (US)

(72) Inventors: Hanyang Chen, Canton, MI (US); Michael Irby, Monroe, MI (US); Matthew Loiselle, LaSalle, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

(21) Appl. No.: 15/997,613

(22) Filed: Jun. 4, 2018

(65) Prior Publication Data

US 2019/0368458 A1 Dec. 5, 2019

(51) Int. Cl.
*F02N 11/08* (2006.01)
*B60W 30/194* (2012.01)
*B60W 10/26* (2006.01)

(52) U.S. Cl.
CPC ....... *F02N 11/0829* (2013.01); *B60W 30/194* (2013.01); *F02N 11/0825* (2013.01); *B60W 10/26* (2013.01); *F02N 2200/02* (2013.01); *F02N 2200/061* (2013.01); *F02N 2200/064* (2013.01)

(58) Field of Classification Search
CPC ............ F02N 11/0829; F02N 11/0825; F02N 2200/02; F02N 2200/061; F02N 2200/064
USPC ...................................................... 123/179.4
See application file for complete search history.

(56) References Cited

U.S. PATENT DOCUMENTS

| | | |
|---|---|---|
| 7,689,331 B2 | 3/2010 | Moran |
| 9,506,445 B2 | 11/2016 | Ghoneim et al. |
| 9,776,635 B2 | 10/2017 | Khafagy et al. |
| 2002/0185098 A1 | 12/2002 | Perry et al. |
| 2018/0261896 A1* | 9/2018 | Ogawa ................ F02N 11/0862 |
| 2018/0298863 A1* | 10/2018 | Kondo .................. F02N 11/084 |

FOREIGN PATENT DOCUMENTS

WO 2013113600 A1 8/2013

* cited by examiner

*Primary Examiner* — Joseph J Dallo
*Assistant Examiner* — Yi-Kai Wang
(74) *Attorney, Agent, or Firm* — Geoffrey Brumbaugh; McCoy Russell LLP

(57) ABSTRACT

Systems and methods for operating a vehicle that includes an engine that may be automatically stopped and started are described. In one example, thresholds for allowing or inhibiting of automatic engine stopping and starting may be adjusted in response to an automatic engine cranking time. Additionally, automatic engine stopping may be inhibited during some conditions.

20 Claims, 5 Drawing Sheets

SYSTEM AND METHODS FOR CONTROLLING A STOP/START ENGINE

FIELD

The present description relates to methods and a system for operating an engine that may be automatically stopped and started to conserve fuel. The methods and systems may be particularly useful to increase or decrease the frequency of automatic engine stopping and starting responsive to vehicle system conditions.

BACKGROUND AND SUMMARY

A vehicle may include an engine that may be automatically stopped and started to conserve fuel. The engine may be stopped via a controller in response to vehicle operating conditions without receiving a specific request to stop the engine from a human driver or occupant of the vehicle. However, before the controller automatically stops the engine, specific vehicle operating conditions may have to be present. For example, a battery state of charge (SOC) may have to be greater than 70% and a battery temperature may have to be greater than 0° C. before the engine is permitted to automatically stop. The SOC and battery temperature thresholds are boundary conditions that are a basis for permitting or inhibiting automatic engine stopping and starting because a capacity of a lead-acid battery to crank an engine decreases at lower SOC and engine temperature. The battery SOC and temperature thresholds may also be useful to ensure desired engine starting performance during conditions of corrosion of electrical engine starting components and an aged starter. In addition, since the battery's capacity to crank an engine at a particular battery SOC and temperature decreases as the battery ages, battery SOC and temperature thresholds may be useful to ensure engine cranking performance is maintained at a desired level. On the other hand, if a battery is replaced, engine cranking performance may improve. However, because the SOC and battery temperature thresholds define minimum conditions for automatic engine stopping and starting, opportunities to automatically stop and start an engine may not be increased even though engine cranking performance may be increased due to the new battery.

The inventors herein have recognized the above-mentioned issues and have developed an engine operating method, comprising: decreasing a battery state of charge threshold in response to an automatic engine cranking time being less than a first threshold amount of time via a controller; and automatically stopping and starting an engine in response to a battery state of charge being greater than the battery state of charge threshold via the controller.

By decreasing a battery state of charge threshold in response to an automatic engine cranking time being less than a first threshold amount of time, it may be possible to provide the technical result of automatically stopping and starting an engine at lower battery SOC levels when a battery is new and has capacity to crank an engine at a speed that allows the engine to start quickly even though battery SOC is not at a very high level. Consequently, there may be more opportunities to stop the engine so that fuel may be conserved. As the battery ages, the SOC threshold may be increased so that vehicle occupants may not be concerned with longer cranking times that may be associated with starting an engine with an aged battery that has a low SOC.

The present description may provide several advantages. In particular, the approaches may improve vehicle drivability for some drivers. Further, the approaches allow automatic engine stopping and starting to be permitted more frequently during some conditions. Further still, the approach may provide more consistent engine cranking times over a life cycle of a battery.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
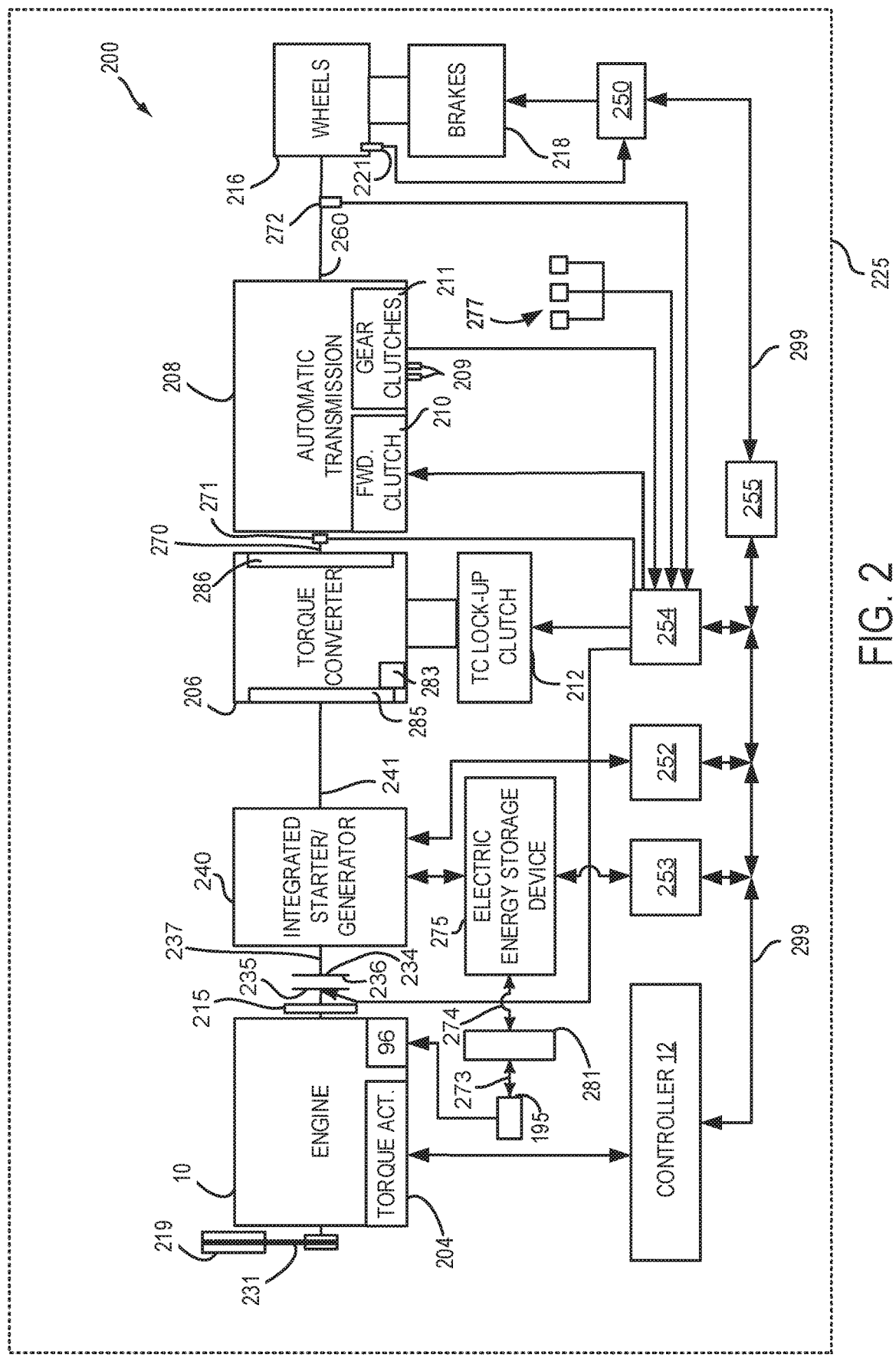
FIG. 2 is a schematic diagram of a vehicle driveline.
Figure 3:
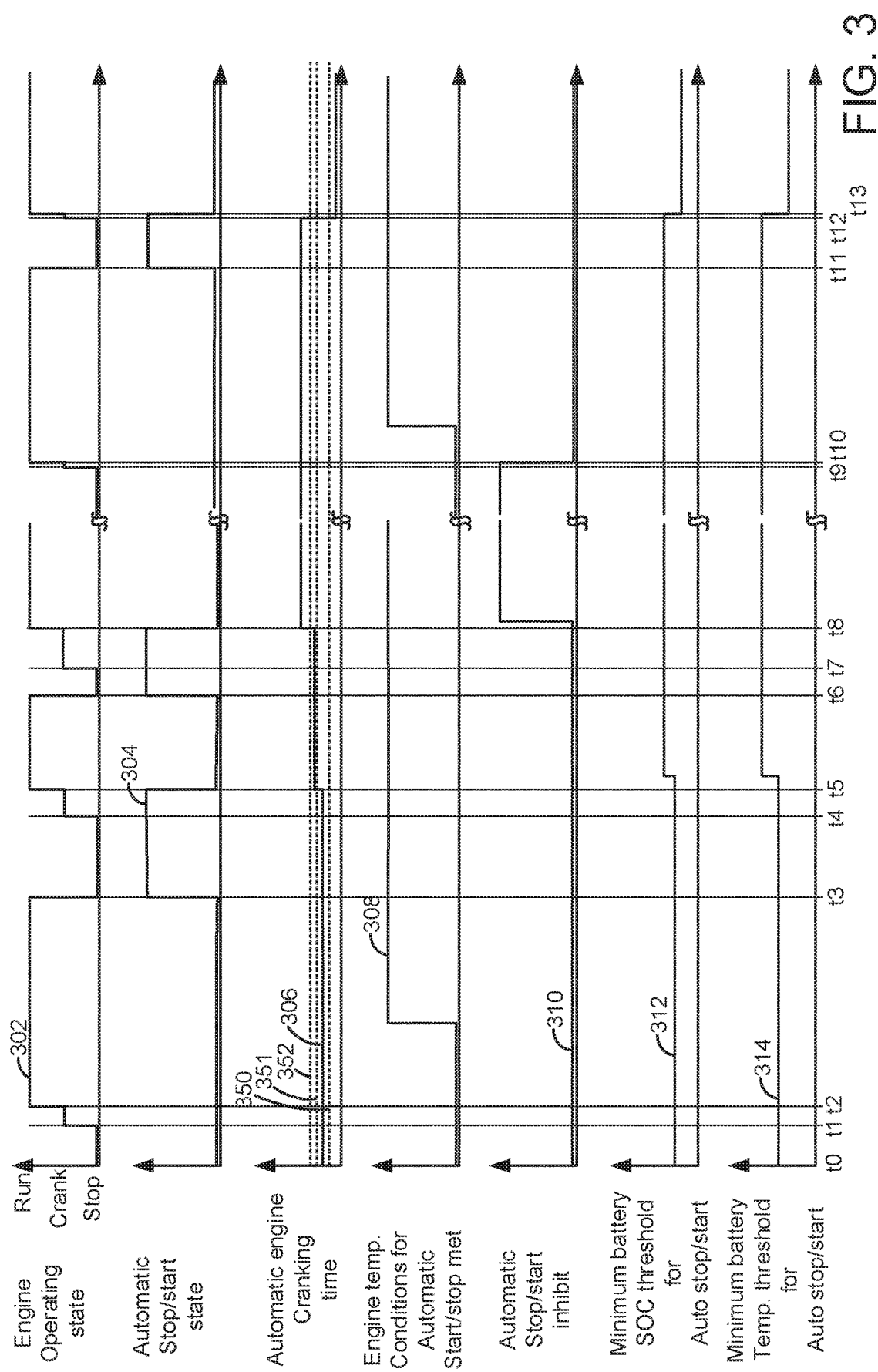
FIG. 3 shows an example vehicle operating sequence.

The present description is related to operating an engine and adjusting a battery SOC threshold that is the basis for determining whether or not an engine may be automatically stopped and started. The battery SOC threshold may be lowered when automatic engine cranking times are short to permit more frequent engine stopping and starting. The battery SOC threshold may be increased when the automatic engine cranking times are longer so that engine starting performance may be maintained. The engine may be of the type shown in FIG. 1 or the engine may be a diesel engine. The engine may be included in a driveline of a vehicle as is shown in FIG. 2. The engine may be operated as is shown in the sequence of FIG. 3. The engine may be operated according to the method of FIGS. 4A and 4B.

Figure 1:
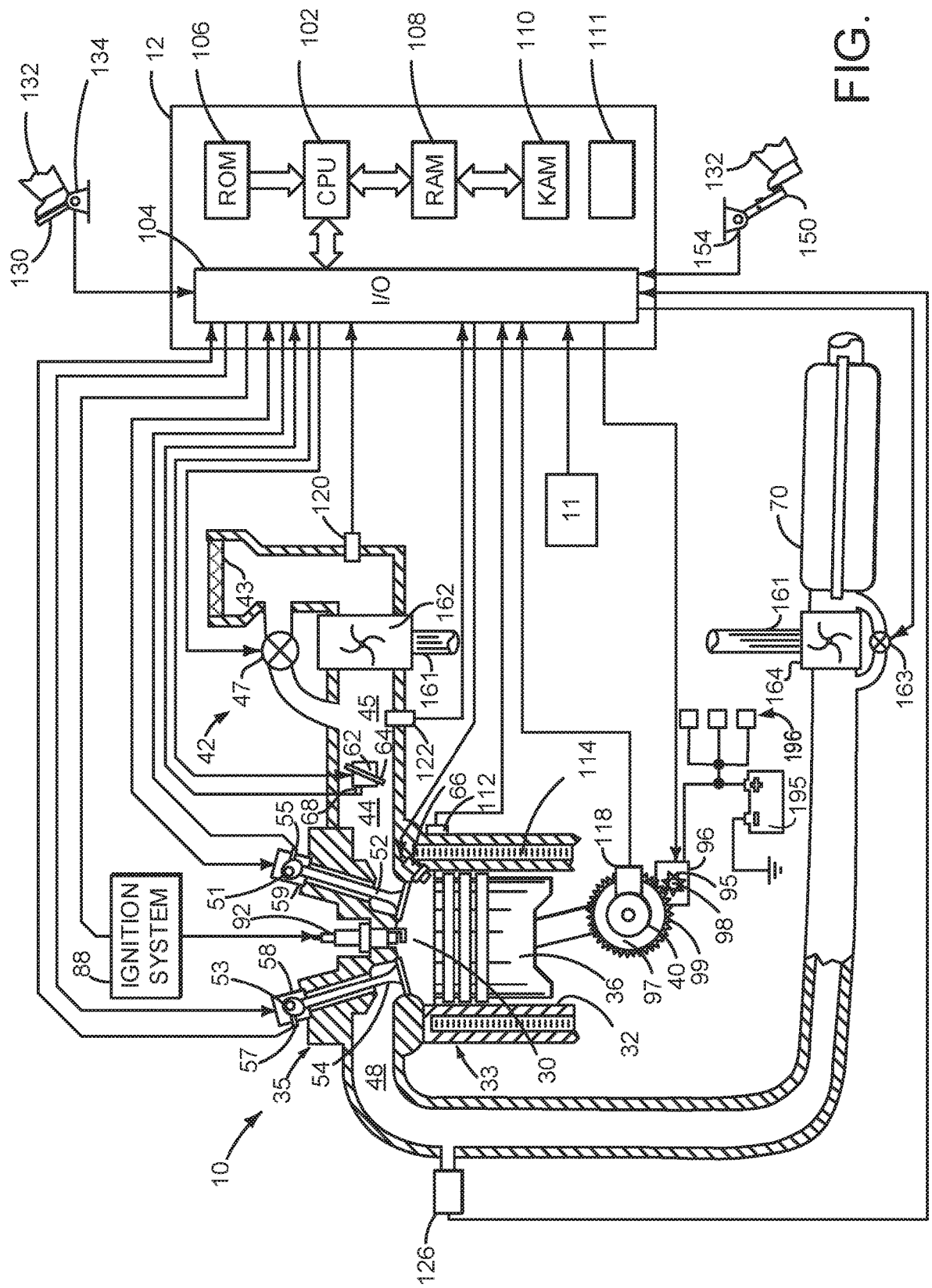
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Controller 12 receives signals from the various sensors shown in FIGS. 1 and 2. Further, controller 12 employs the actuators shown in FIGS. 1 and 2 to adjust engine operation based on the received signals and instructions stored in non-transitory memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Starter 96 is selectively supplied with electrical power via battery 195. Battery 195 also supplies electrical power to accessories 196, which may include lights, entertainment systems, controller 12, and other electric consumers.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Wastegate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 may also include one or more timers and/or counters 111 that keep track of an amount of time between a first event and a second event. The timer and/or counters may be constructed in hardware or software. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as a motor/generator. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG is mechanically coupled to engine 10 via belt 231. BISG may be coupled to crankshaft 40 or a camshaft (e.g., 51 or 53). BISG may operate as a motor when supplied with electrical power via electric energy storage device 275 or low voltage battery 195. BISG may operate as a generator supplying electrical power to electric energy storage device 275 or low voltage battery 195. Bi-directional DC/DC converter 281 may transfer electrical energy from a high voltage buss 274 to a low voltage buss 273 or vise-versa. Low voltage battery 195 is electrically coupled to low voltage buss 273. Electric energy storage device 275 is electrically coupled to high voltage buss 274. Low voltage battery 195 selectively supplies electrical energy to starter motor 96.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG or BISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, the system of FIGS. 1 and 2 provides for a system, comprising: an engine; a starter coupled to the engine; and a controller including executable instructions stored in non-transitory memory to decrease a battery state of charge threshold in response to an automatic cranking time being less than a first threshold amount of time, and instructions to automatically stop and start the engine in response to a battery state of charge being greater than the battery state of charge threshold via the controller. The system further comprises additional instructions to inhibit automatic stopping and starting of the engine in response to the battery state of charge being greater than the battery state of charge threshold, battery temperature being greater than a battery temperature threshold, and an engine cranking time of an operator requested engine start being greater than a second threshold amount of time, the second threshold amount of time greater than the first threshold amount of time. The system further comprises additional instructions to increase the battery state of charge threshold in response to the automatic cranking time being greater than a second threshold amount of time via the controller. The system includes where the controller automatically starts the engine via the starter. The system further comprising an integrated starter/generator, and where the controller automatically starts the engine via the integrated starter/generator.

Referring now to FIG. 3, example plots of a vehicle operating sequence are shown. The operating sequence may be performed via the system of FIGS. 1 and 2 in cooperation with the method of FIGS. 4A and 4B. Vertical lines at times t0-t13 represent times of interest during the sequence. The plots in FIG. 3 are time aligned and occur at the same time. The double SS marks along the horizontal axes of the plots indicate a break in time and the duration of the break may be long or short.

The first plot from the top of FIG. 3 is a plot of engine operating state versus time. The vertical axis represents engine operating state and the engine is operating (e.g., combusting fuel and rotating) when trace 302 is at a higher level near the Run label that is located along the vertical axis. The engine is not operating (e.g., not combusting fuel and rotation is stopped) when trace 302 is at a lower level near the Stop label that is located along the vertical axis. The engine is being cranked (e.g., the engine is rotated via an electric machine before the engine accelerates under its own power) when trace 302 is at the level near the Crank label that is located along the vertical axis. The horizontal axis represents time and time increases from the left side of the figure to the right side of the figure. Solid line 302 represents the engine operating state.

The second plot from the top of FIG. 3 is a plot of engine automatic stop/start state versus time. The vertical axis represents the automatic engine stop/start state and the engine is being automatically stopped, has been automatically stopped, or is automatically starting when trace 304 is at a higher level near the vertical axis arrow. The engine is not being automatically stopped, has not been automatically stopped, or is not being automatically started when trace 304 is at a lower level near the horizontal axis. Automatic engine stopping and starting is performed via controller 12 without a human driver providing input to a dedicated input to the controller for requesting engine stopping and starting (e.g., an ignition key switch or pushbutton). An automatic engine stop may be performed responsive to a low driver demand torque, a brake pedal being applied, and a vehicle speed. An automatic engine start may be performed via releasing a brake pedal, a low battery SOC, or driver demand torque being greater than a threshold.

The third plot from the top of FIG. 3 is a plot of an automatic engine cranking time versus time. The vertical axis represents engine cranking time and the engine cranking time increases in the direction of the vertical axis arrow. The horizontal axis represents time and time increases from the left side of the figure to the right side of the figure. Trace 306 represents the automatic engine cranking time (e.g., an amount of time between a first time when the engine begins to rotate after being at zero speed and a second time when the engine accelerates under its own power when the engine is automatically started).

Horizontal line 350 represents a first threshold engine cranking time. If engine cranking time is below the amount of time represented by first threshold 350, then the minimum battery SOC threshold for automatic engine stopping and starting is reduced. Further, if engine cranking time is below the amount of time represented by first threshold engine cranking time 350, then the minimum battery temperature threshold for automatic engine stopping and starting is reduced. The first threshold engine cranking time 350 is the only threshold engine cranking time that is a basis for reducing the minimum battery SOC and the minimum battery temperature. The minimum battery SOC threshold and minimum battery temperature threshold are not reduced based on any other threshold engine cranking time so that the minimum battery SOC threshold and minimum battery temperature threshold are only adjusted to lower levels when engine cranking time is indicative of a new battery (e.g., a battery that has been used in a stop/start vehicle for less than 6 months). This conditionality may help to prevent variations in conditions that permit automatic engine stopping and starting so that vehicle occupants may experience more consistent automatic engine stopping and starting.

Horizontal line 351 represents a second threshold engine cranking time. If engine cranking time is above the amount of time represented by second threshold 351 and below the amount of time represented by third threshold 352, then the minimum battery SOC threshold for automatic engine stopping and starting is increased. Further, if engine cranking time is above the amount of time represented by second threshold engine cranking time 351 and below the amount of time represented by third threshold 352, then the minimum battery temperature threshold for automatic engine stopping and starting is increased.

Horizontal line 352 represents a third threshold engine cranking time. If engine cranking time is above the amount of time represented by third threshold 352, then automatic engine stopping and starting is inhibited. The minimum battery SOC threshold for automatic engine stopping and starting is not adjusted when engine cranking time is greater than the amount of time represented by horizontal line 352. Further, the minimum battery temperature threshold for automatic engine stopping and starting is not adjusted when engine cranking time is greater than the amount of time represented by horizontal line 352.

The fourth plot from the top of FIG. 3 is a plot of a state that indicates that engine temperature conditions for permitting automatic engine stopping and starting have been met. The vertical axis represents the state of engine temperature conditions for permitting automatic engine stopping and starting. Engine temperature conditions for permitting automatic engine stopping and starting have been met when trace 308 is at a higher level near the vertical axis arrow. Engine temperature conditions for permitting automatic engine stopping and starting have not been met when trace 308 is at a lower level near the horizontal axis. Trace 308 represents the state of engine temperature conditions for permitting automatic engine stopping and starting. The horizontal axis represents time and time increases from the left side of the figure to the right side of the figure.

The fifth plot from the top of FIG. 3 is a plot of a state of automatic engine stopping and starting being inhibited. The vertical axis represents the state of automatic engine stopping and starting inhibit. Automatic engine stopping and starting is inhibited when trace 310 is at a higher level near the vertical axis arrow. Automatic engine stopping and starting is not inhibited when trace 310 is at a lower level near the horizontal axis. Trace 310 represents state of automatic engine stopping and starting being inhibited. The horizontal axis represents time and time increases from the left side of the figure to the right side of the figure.

The sixth plot from the top of FIG. 3 is a plot of a minimum battery SOC threshold for automatic engine stopping and starting versus time. The vertical axis represents the minimum battery SOC threshold and the minimum battery SOC threshold increases in the direction of the vertical axis arrow. The horizontal axis represents time and time increases from the left side of the figure to the right side of the figure. Trace 312 represents the minimum battery SOC threshold. The engine may be automatically stopped and started when battery SOC exceeds the minimum battery SOC threshold.

The seventh plot from the top of FIG. 3 is a plot of a minimum battery temperature threshold for automatic engine stopping and starting versus time. The vertical axis represents the minimum battery temperature threshold and the minimum battery temperature threshold increases in the direction of the vertical axis arrow. The horizontal axis represents time and time increases from the left side of the figure to the right side of the figure. Trace 314 represents the minimum battery temperature threshold. The engine may be automatically stopped and started when battery temperature exceeds the minimum battery temperature threshold.

At time t0, the engine is stopped (e.g., not rotating and not combusting fuel) and the engine is has not been automatically stopped as is indicated by the automatic engine stop/start state trace 304. The automatic engine cranking time for a previous engine cranking period is greater than first threshold 350 and less than second threshold 351. Engine temperature conditions for permitting automatic engine stopping and starting have not been met and automatic engine stopping and starting has not been inhibited. The minimum battery SOC threshold for automatic engine stopping and starting is at a middle level and the minimum battery temperature for automatic engine stopping and starting is at a middle level. Such conditions are indicative of when the engine has been turned off by a human driver for an extended period of time.

At time t1, the engine is cranked in response to a human driver requesting an engine start (not shown). The engine is not being automatically started and the automatic engine cranking time has not changed since time t0 since engine cranking is not complete. Engine temperature conditions for permitting automatic engine stopping and starting have not been met and automatic engine stopping and starting has not been inhibited. The minimum battery SOC and minimum battery temperature threshold have not changed since time t0.

At time t2, the engine cranking is complete and the engine is started. The engine is not being automatically started and the automatic engine cranking time is not increased since the engine has not been automatically started. Engine temperature conditions for permitting automatic engine stopping and starting have not been met and automatic engine stopping and starting has not been inhibited. The minimum battery SOC and minimum battery temperature threshold have not changed since time t0.

Between time t2 and time t3, the engine continues to run (e.g., combust fuel and rotate) and the engine temperature conditions for permitting automatic engine stopping and starting have been met as indicated by trace 308 changing to a higher level. The engine is not being automatically started and the automatic engine cranking time has not changed since time t0. Automatic engine stopping and starting has not been inhibited and the minimum battery SOC and minimum battery temperature threshold have not changed since time t0.

At time t3, the engine is automatically stopped as is indicated by the engine being stopped and the engine automatic stop/start state changing to a higher level. The automatic engine cranking time has not changed since time t0 and engine temperature conditions for permitting automatic engine stopping and starting have been met. Automatic engine stopping and starting has not been inhibited and the minimum battery SOC and minimum battery temperature threshold have not changed since time t0.

At time t4, the engine is automatically cranked to automatically start the engine in response to vehicle operating conditions and not in response to a human driver requesting an engine start (not shown) via a dedicated device or input for requesting engine stopping and starting. The automatic engine cranking time has not changed since time t0 since automatic engine cranking is not complete. Engine temperature conditions for permitting automatic engine stopping and starting have been met and automatic engine stopping and starting has not been inhibited. The minimum battery SOC and minimum battery temperature threshold have not changed since time t0.

At time t5, the automatic engine cranking is complete and the engine is started. The automatic engine cranking time has increased by an amount so as to exceed second threshold 351, but less than an amount to exceed third threshold 352. Engine temperature conditions for permitting automatic engine stopping and starting have been met and automatic engine stopping and starting has not been inhibited. The minimum battery SOC and minimum battery temperature threshold have not changed since time t0.

Between time t5 and time t6, the minimum battery SOC and minimum battery temperature threshold are increased in response to the automatic engine cranking time exceeding second threshold 351. The engine continues to run and the engine is not being automatically started or stopped. Engine temperature conditions for permitting automatic engine stopping and starting have been met and automatic engine stopping and starting has not been inhibited.

At time t6, the engine is automatically stopped as is indicated by the engine being stopped and the engine automatic stop/start state changing to a higher level. The automatic engine cranking time has not changed since time t5 and engine temperature conditions for permitting automatic engine stopping and starting have been met. Automatic engine stopping and starting has not been inhibited and the minimum battery SOC and minimum battery temperature threshold continue at their previous levels.

At time t7, the engine is automatically cranked to automatically start the engine in response to vehicle operating conditions and not in response to a human driver requesting an engine start (not shown) via a dedicated device or input for requesting engine stopping and starting. The automatic engine cranking time has not changed since time t5 since automatic engine cranking is not complete. Engine temperature conditions for permitting automatic engine stopping and starting have been met and automatic engine stopping and starting has not been inhibited. The minimum battery SOC and minimum battery temperature threshold continue at their previous levels.

At time t8, the automatic engine cranking is complete and the engine is started. The automatic engine cranking time has increased by an amount so as to exceed third threshold 352. Engine temperature conditions for permitting automatic engine stopping and starting have been met. The minimum battery SOC and minimum battery temperature threshold have not been increased in response to the increased automatic engine cranking time. However, shortly after time t8, automatic engine stopping and starting is inhibited. By inhibiting automatic engine stopping and starting, vehicle occupants may not be subject to long automatic engine cranking times, which may be objectionable. A break in time occurs between time t8 and time t9 and the vehicle's battery that supplies power to the starter is replaced during the break (not shown).

At time t9, the engine is cranked in response to a human driver requesting an engine start (not shown). The engine is not being automatically started and the automatic engine cranking time is at its previous level. Engine temperature conditions for permitting automatic engine stopping and starting have not been met and automatic engine stopping and starting has not been inhibited. The minimum battery SOC and minimum battery temperature threshold continue at their previous levels.

At time t10, the human driver initiated engine cranking is complete and the engine is started. The automatic engine cranking time is not increased since the engine has not been automatically started. Engine temperature conditions for permitting automatic engine stopping and starting have not been met and automatic engine stopping and starting has not been inhibited. The minimum battery SOC and minimum battery temperature threshold continue at their previous levels.

Between time t10 and time t11, the engine continues to run (e.g., combust fuel and rotate) and the engine temperature conditions for permitting automatic engine stopping and starting have been met as indicated by trace 308 changing to a higher level. The engine is not being automatically started and the automatic engine cranking time continues at its previous level. Automatic engine stopping and starting has not been inhibited and the minimum battery SOC and minimum battery temperature threshold continue at their previous levels.

At time t11, the engine is automatically stopped as is indicated by the engine being stopped and the engine automatic stop/start state changing to a higher level. The automatic engine cranking time has not changed since time t10 and engine temperature conditions for permitting automatic engine stopping and starting have been met. Automatic engine stopping and starting has not been inhibited and the minimum battery SOC and minimum battery temperature threshold have not changed since time t10.

At time t12, the engine is automatically cranked to automatically start the engine in response to vehicle operating conditions and not in response to a human driver requesting an engine start (not shown) via a dedicated device or input for requesting engine stopping and starting. The automatic engine cranking time has not changed since time t10 since automatic engine cranking is not complete. Engine temperature conditions for permitting automatic engine stopping and starting have been met and automatic engine stopping and starting has not been inhibited. The minimum battery SOC and minimum battery temperature threshold have not changed since time t10.

At time t13, the automatic engine cranking is complete and the engine is started. The automatic engine cranking time has decreased by an amount so as to be less than first threshold 350. Therefore, shortly after time t13 the minimum battery SOC and minimum battery temperature threshold are decreased so that opportunities to automatically stop and start the engine may be increased. The reduction in the minimum battery SOC and minimum battery temperature threshold are due to the short engine cranking time, which indicates that a new battery is being applied to start the engine.

In this way, automatic engine stopping and starting battery SOC and battery temperature thresholds may be adjusted to increase or decrease opportunities to automatically stop and start the engine. The thresholds may be adjusted responsive to automatic engine cranking times and not human initiated engine cranking times. By adjusting the battery SOC and battery temperature thresholds in response to automatic engine cranking times and not in response to human initiated engine cranking times, a better evaluation metric for determining battery capability to crank the engine may be provided since automatic engine cranking is performed under conditions that are more restricted than conditions during human initiated engine cranking.

Figure 4A:
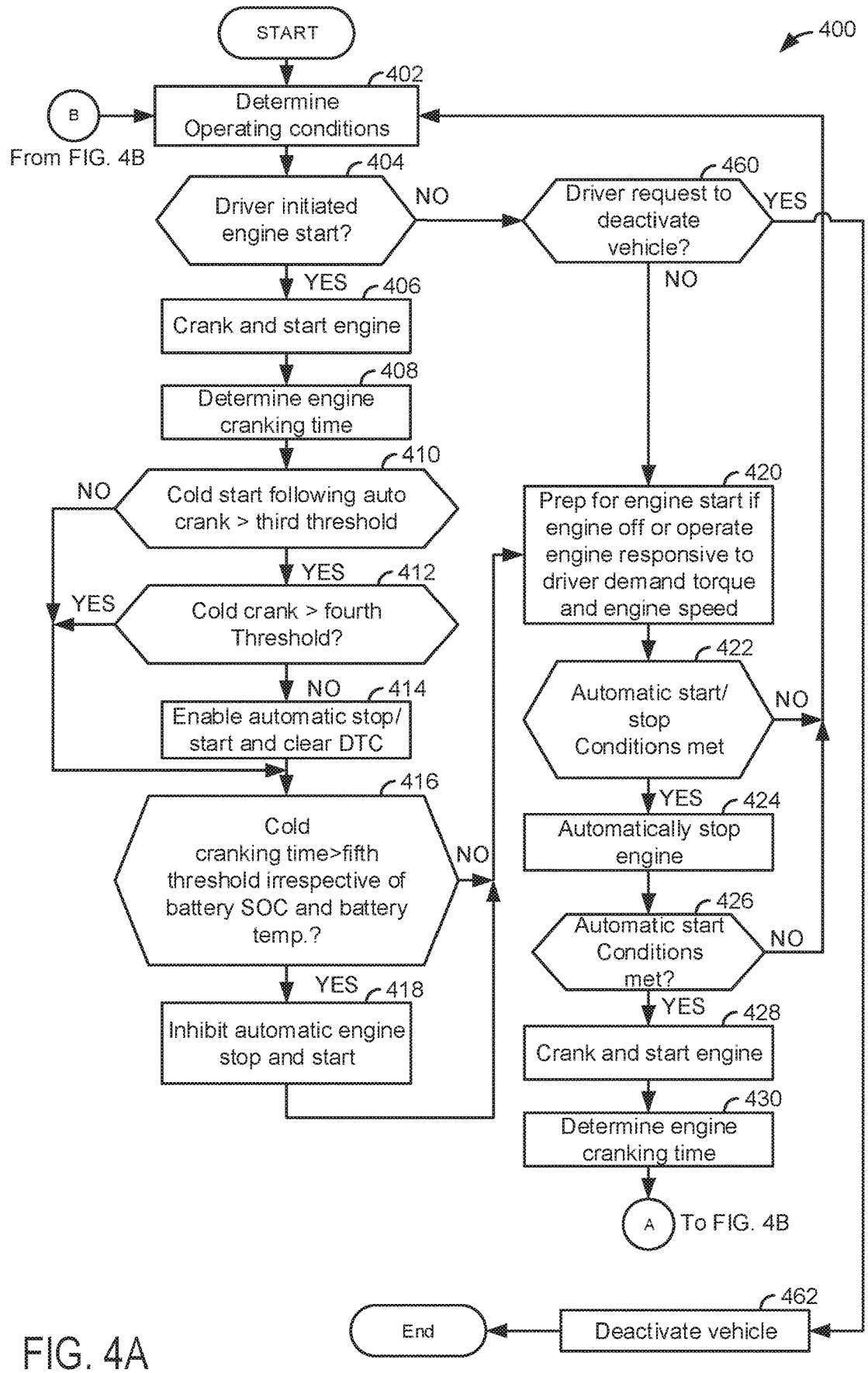
FIGS. 4A and 4B show a method for operating an engine including automatically stopping and starting the engine.
Figure 4B:
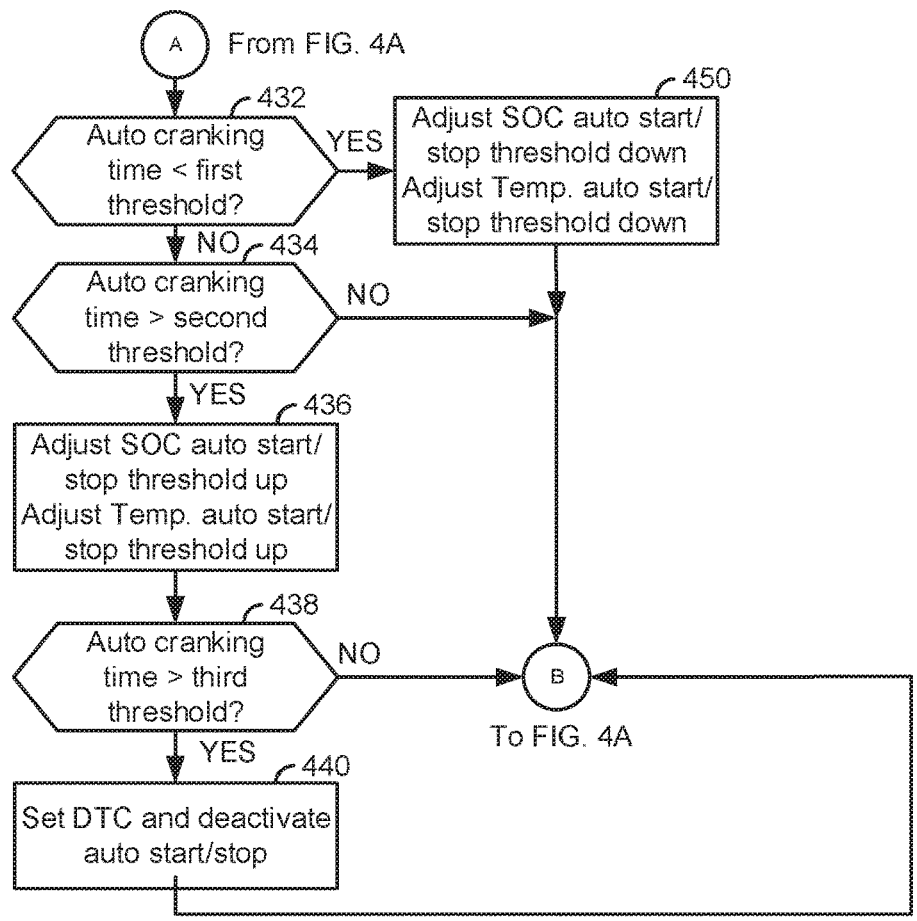

Referring now to FIGS. 4A and 4B a flow chart of a method for operating an engine that includes automatic stopping and starting capability is shown. The method of FIGS. 4A and 4B may be incorporated into and may cooperate with the system of FIGS. 1 and 2. Further, at least portions of the method of FIGS. 4A and 4B may be incorporated as executable instructions stored in non-transitory memory while other portions of the method may be performed via a controller transforming operating states of devices and actuators in the physical world.

At 402, method 400 determines operation conditions. Operating conditions may include but are not limited to engine speed, battery SOC, engine temperature, battery temperature, battery voltage, engine load, driver demand torque, and engine operating state. The operating conditions may be determined via inputs to the controller. Method 400 proceeds to 404.

At 404, method 400 judges if a human driver of the vehicle has request an engine start. A human driver may request an engine start via a device or input (e.g., a human/machine interface, key switch, pushbutton) that has a sole function of requesting an engine start. If method 400 judges that the human driver is requesting an engine start, then the answer is yes and method 400 proceeds to 406. Otherwise, the answer is no and method 400 proceeds to 460.

At 460, method 400 judges if there is a human driver request to deactivate the vehicle. The human driver may request vehicle deactivation via a human/machine interface. If method 400 judges that there is a human driver request to deactivate the vehicle, the answer is yes and method 400 proceeds to 462. Otherwise, the answer is no and method 400 proceeds to 420.

At 462, method 400 deactivates the vehicle. The vehicle may be deactivated via ceasing to supply fuel to the engine, deactivating a fuel pump, deactivating electric machines via ceasing to supply electrical power to the electric machines, and shutting down other vehicle systems. Method 400 proceeds to exit.

At 406, method 400 cranks the engine via an electric machine (e.g., a starter 96) and starts the engine. The engine is supplied with fuel and spark while it is being cranked. The engine cranking begins from zero rotational speed and an engine cranking period begins when the engine first starts to rotate from zero speed during the engine cranking and start sequence in response to the human driver's request to start the engine. The engine cranking period ends when the engine accelerates under its own power above a speed that the electric machine rotates the engine without the engine speed decreasing to the speed of the electric machine until the engine reaches idle speed. In other words, the engine cranking period ends when engine rotational speed exceeds the rotational speed of the electric machine and the engine starts and runs up to idle speed. Alternatively, the engine cranking period may end when the engine has rotated via the electric machine for a predetermined amount of time without the engine achieving idle speed. The engine accelerates to engine idle speed after the engine is started. In one example, method 400 starts a timer within the controller when the engine cranking period starts and stops the timer from increasing in value when the engine cranking period ends. Method 400 proceeds to 408.

At 408, method 400 determines the engine cranking time. In one example, method 400 retrieves a value of the cranking timer described at 428 to determine the engine cranking time. Method 400 proceeds to 410.

At 410, method 400 judges if the present engine start is a cold start or a human initiated engine start that follows a most recent automatic crank or automatic engine crank during which the automatic engine cranking time exceeded a third threshold cranking time value. In one example, method 400 may judge that the present engine start is a cold start or a human initiated engine start that follows a most recent automatic crank or automatic engine crank during which the automatic engine cranking time exceeded a third threshold cranking time value based on a value of a variable stored in controller memory. If the value of the variable indicates that the present engine start is a cold start or a human initiated engine start that follows a most recent automatic crank or automatic engine crank during which the automatic engine cranking time exceeded a third threshold cranking time value, then the answer is yes and method 400 proceeds to 412. Otherwise, the answer is no and method 400 proceeds to 416.

At 412, method 400 judges if the engine cranking time of the most recent human driver initiated engine start exceeds a fourth threshold amount of engine cranking time. The fourth threshold amount of cranking time may be a predetermined amount of time (e.g., 1 second) that indicates the battery supplying power to crank the engine still has some useful life for meeting automatic engine cranking performance objectives (e.g., an automatic engine cranking time that is less than a threshold amount of time). If method 400 judges that the engine cranking time of the most recent human driver initiated engine start exceeds the fourth threshold amount of engine cranking time, the answer is yes and method 400 proceeds to 416. Otherwise, the answer is no and method 400 proceeds to 414. Thus, inhibiting of automatic engine starting may be maintained if a human initiated engine cold start cranking time exceeds a threshold amount of time after an automatic engine cranking time has exceeded a third threshold automatic engine cranking time.

At 414, method 400 enables automatic engine stopping and starting (e.g., deactivates inhibiting of automatic engine stopping and starting) and clears diagnostic codes (DTC) to indicate that automatic engine cranking is allowed. Method 400 proceeds to 416.

At 416, method 400 judges if the human initiated engine cranking time (e.g., cold cranking time) is greater than a fifth threshold irrespective of battery SOC and battery temperature. Thus, automatic stopping and starting of the engine may be inhibited in response to battery state of charge being greater than the battery state of charge threshold, battery temperature being greater than a battery temperature threshold, and an engine cranking time of an operator requested engine start being greater than a second threshold amount of time, the second threshold amount of time greater than the first threshold amount of time. The fifth threshold may be an amount of cranking time (e.g., 1.25 seconds) that indicates that the battery supplying power to the electric machine used to crank the engine may have insufficient capacity to automatically stop and start the engine within expected engine cranking performance criteria. If method 400 judges that the human initiated engine cranking time is greater than the fifth threshold, then the answer is yes and method 400 proceeds to 418. Otherwise, the answer is no and method 400 proceeds to 420.

At 418, method 400 inhibits automatic engine stopping and starting. Human driver initiated engine stopping and starting is permitted. The engine is not stopped automatically responsive to vehicle operating conditions when automatic engine stopping and starting is inhibited. Alternatively, method 400 may instead continue to automatically stop the engine and then automatically start the engine via a second electric machine (e.g., ISG 240) that is power via a second battery (e.g., electric energy storage device 275) or via both the second electric machine and the first electric machine. Method 400 proceeds to 420.

At 420, method 400 prepares the engine for starting if the engine is not started and operates the engine responsive to driver demand torque, engine speed, and other vehicle control parameters. The engine may be prepared for starting via pressurizing fuel supplied to the engine and activating the ignition system. The engine is operated via supplying spark and fuel to the engine via the sensors and actuators shown in FIG. 1. Method 400 proceeds to 422.

At 422, method 400 judges if automatic engine stopping and starting conditions have been met. Automatic engine stopping and starting conditions may include but are not limited to engine temperature being greater than a threshold temperature, battery SOC being greater than a threshold battery SOC, battery temperature being greater than a threshold battery temperature, the brake pedal being applied, and vehicle speed being less than a threshold speed. If method 400 judges that automatic engine stopping and starting conditions are met, the answer is yes and method 400 proceeds to 424. Otherwise, the answer is no and method 400 returns to 402.

At 424, method 400 automatically stops the engine from rotating. The engine may be stopped via ceasing fuel delivery and spark delivery to the engine. For example, fuel injectors may cease injecting fuel to engine cylinders to stop the engine. Method 400 proceeds to 426.

At 426, method 400 judges if automatic engine starting conditions have been met. Automatic engine starting conditions may include but are not limited to release of a brake pedal or driver demand torque greater than a threshold driver demand torque and battery SOC less than a threshold battery SOC. If method 400 judges that automatic engine starting conditions have been met, the answer is yes and method 400 proceeds to 428. Otherwise, the answer is no and method 400 returns to 402.

At 428, method 400 automatically cranks the engine via an electric machine (e.g., a starter 96) and starts the engine. The engine is supplied with fuel and spark while it is being cranked. The engine cranking begins from zero rotational speed and an engine cranking period begins when the engine first starts to rotate from zero speed during the engine cranking and starting sequence in response to the controller initiating the engine start. The engine cranking period ends when the engine accelerates under its own power above a speed that the electric machine rotates the engine without the engine speed decreasing to the speed of the electric machine until the engine reaches idle speed. In other words, the engine cranking period ends when engine rotational speed exceeds the rotational speed of the electric machine and the engine starts and runs up to idle speed. Alternatively, the engine cranking period may end when the engine has rotated via the electric machine for a predetermined amount of time without the engine achieving idle speed. The engine accelerates to engine idle speed after the engine is started. In one example, method 400 starts a timer within the controller when the engine cranking period starts and stops the timer from increasing in value when the engine cranking period ends. Method 400 proceeds to 430.

At 430, method 400 determines the engine cranking time. In one example, method 400 retrieves a value of the cranking timer described at 428 to determine the engine cranking time. Method 400 proceeds to 432.

At 432, method 400 judges if the present automatic engine cranking time is less than a first threshold automatic cranking time value (e.g., 500 milliseconds). In one example, first threshold automatic engine cranking time is empirically determined and it is the only threshold automatic engine cranking time that is a basis for reducing the minimum battery SOC and the minimum battery temperature. The minimum battery SOC threshold and minimum battery temperature threshold are not reduced based on any other threshold automatic engine cranking time so that the minimum battery SOC threshold and minimum battery temperature threshold are only adjusted to lower levels when automatic engine cranking time is indicative of a new battery (e.g., a battery that has been used in a stop/start vehicle for less than 6 months). If the present automatic engine cranking time is less than the first threshold automatic engine cranking time value, then the answer is yes and method 400 proceeds to 450. Otherwise, the answer is no and method 400 proceeds to 434.

At 450, method 400 adjusts the battery SOC threshold for permitting an automatic engine stop and start. The battery SOC threshold is reduced by a predetermined amount (e.g., by 2%). In some examples, the battery SOC threshold may be reduced by the predetermined amount after each automatic engine start where the automatic cranking time is less than the first threshold amount of time until the battery SOC threshold is a predetermined SOC. Alternatively, the battery SOC threshold may be reduced to a predetermined value (e.g., 50%). The battery SOC must be greater than the battery SOC threshold for the engine to automatically stop and start. Method 400 also adjusts the battery temperature threshold for permitting an automatic engine stop and start. The battery temperature threshold is reduced by a predetermined amount (e.g., by 2%). Alternatively, the battery temperature threshold may be reduced to a predetermined value (e.g., 0° C.). The battery temperature must be greater than the battery temperature threshold for the engine to automatically stop and start. Method 400 returns to 402.

At 434, method 400 judges if the present automatic engine cranking time is greater than a second threshold automatic cranking time value (e.g., 800 milliseconds). In one example, second threshold automatic engine cranking time is empirically determined via monitoring automatic engine cranking times over a vehicle life cycle. If the present automatic engine cranking is greater than the second threshold automatic cranking time value, then the answer is yes and method 400 proceeds to 436. Otherwise, the answer is no and method 400 returns to 402.

At 436, method 400 adjusts the battery SOC threshold for permitting an automatic engine stop and start. The battery SOC threshold is increased by a predetermined amount (e.g., by 2%). Alternatively, the battery SOC threshold may be increased to a predetermined value (e.g., 80%). The battery SOC must be greater than the battery SOC threshold for the engine to automatically stop and start. Method 400 also adjusts the battery temperature threshold for permitting an automatic engine stop and start. The battery temperature threshold is increased by a predetermined amount (e.g., by 2%). Alternatively, the battery temperature threshold may be increased to a predetermined value (e.g., 15° C.). The battery temperature must be greater than the battery temperature threshold for the engine to automatically stop and start. Method 400 proceeds to 438.

At 438, method 400 judges if the present automatic engine cranking time is greater than a third threshold automatic engine cranking time value (e.g., 1 second). In one example, third threshold automatic engine cranking time is empirically determined via monitoring automatic engine cranking times over a vehicle life cycle. If the present automatic engine cranking time is greater than the third threshold automatic cranking time value, then the answer is yes and method 400 proceeds to 440. Otherwise, the answer is no and method 400 returns to 402. Method 400 may also set a value of a variable in controller memory to indicate automatic engine cranking time is greater than the third threshold.

At 440, method 400 inhibits or deactivates automatic engine stopping and starting. Therefore, even if the engine is warmed up and driver demand is low, the engine will not be automatically stopped and started to conserve fuel because automatic engine cranking times are longer than may be desired by some vehicle drivers. Alternatively, method 400 may instead continue to automatically stop the engine and then automatically start the engine via a second electric machine (e.g., ISG 240) that is power via a second battery (e.g., electric energy storage device 275) or via both a first and a second electric machine. Additionally, method 400 sets a diagnostic code or provides an indication of automatic stopping and starting system degradation. Method 400 returns to 402.

Thus, the method of FIG. 4 provides for an engine operating method, comprising: decreasing a battery state of charge threshold in response to an automatic cranking time being less than a first threshold amount of time via a controller; and automatically stopping and starting an engine in response to a battery state of charge being greater than the battery state of charge threshold via the controller. The method further comprises not automatically stopping and starting the engine in response to the battery state of charge being less than the battery state of charge threshold via the controller. The method includes where the automatic cranking time is an amount of time an engine is rotated immediately following an automatic engine stop until the engine rotates under its own power. The method includes where the automatic engine stop includes engine speed being zero. The method includes where the engine is rotated via an electric machine. The method further comprises decreasing a battery temperature threshold in response to the automatic cranking time being less than the threshold amount of time via the controller. The method further comprises automatically stopping and starting the engine in response to a battery temperature being greater than the battery threshold temperature. The method further comprises inhibiting automatic stopping and starting of the engine in response to battery state of charge being greater than the battery state of charge threshold, battery temperature being greater than a battery temperature threshold, and an engine cranking time of an operator requested engine start being greater than a second threshold amount of time, the second threshold amount of time greater than the first threshold amount of time.

The method of FIG. 4 also provides for an engine operating method, comprising: decreasing a battery state of charge threshold in response to an automatic cranking time being less than a first threshold amount of time via a controller; increasing the battery state of charge threshold in response to the automatic cranking time being greater than a second threshold amount of time via the controller; and automatically stopping and starting an engine in response to a battery state of charge being greater than the battery state of charge threshold via the controller. The method of further comprises deactivating automatically stopping and starting the engine in response to the automatic cranking time being greater than a third threshold amount of time, the third threshold amount of time greater than the second threshold amount of time. The method further comprises reactivating automatically stopping and starting the engine in response to a cold cranking time that is less than a fourth threshold amount of time. The method includes where decreasing the battery state of charge threshold includes decreasing the battery state of charge threshold a predetermined amount after each automatic engine start where the automatic cranking is less than the first threshold amount of time until the battery state charge of threshold is a predetermined state of charge.

In some examples, the method further comprises inhibiting automatic stopping and starting of the engine in response to the battery state of charge being greater than the battery state of charge threshold, battery temperature being greater than a battery temperature threshold, and an engine cranking time of an operator requested engine start being greater than a third threshold amount of time, the third threshold amount of time greater than the second threshold amount of time. The method of claim 9, further comprising automatically starting the engine via a first electric machine and a second electric machine in response to the battery state of charge being less than the battery state of charge threshold. The method includes where the first electric machine is a low voltage starter and where the second electric machine is a driveline integrated starter/generator.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
   operating an engine with an automatic cranking time being less than a first threshold amount of time;
   decreasing a battery state of charge threshold in response to the automatic cranking time being less than the first threshold amount of time via a controller; and
   automatically stopping and starting the engine in response to a battery state of charge being greater than the decreased battery state of charge threshold via the controller.

2. The method of claim 1, further comprising not automatically stopping and starting the engine in response to the battery state of charge being less than the battery state of charge threshold via the controller.

3. The method of claim 1, where the automatic cranking time is an amount of time the engine is rotated immediately after an automatic engine stop until the engine rotates under its own power.

4. The method of claim 3, where the automatic engine stop includes engine speed being zero.

5. The method of claim 4, where the engine is rotated via an electric machine.

6. The method of claim 4, further comprising decreasing a battery temperature threshold in response to the automatic cranking time being less than the threshold amount of time via the controller.

7. The method of claim 6, further comprising automatically stopping and starting the engine in response to a battery temperature being greater than the battery temperature threshold.

8. The method of claim 1, further comprising inhibiting automatic stopping and starting of the engine in response to the battery state of charge being greater than the battery state of charge threshold, a battery temperature being greater than a battery temperature threshold, and an engine cranking time of an operator requested engine start being greater than a second threshold amount of time, the second threshold amount of time greater than the first threshold amount of time.

9. An engine operating method, comprising:
   decreasing a battery state of charge threshold in response to an automatic cranking time during a first engine start being less than a first threshold amount of time via a controller; and
   automatically stopping and starting an engine subsequent to the first engine start in response to a battery state of charge being greater than the decreased battery state of charge threshold via the controller.

10. The method of claim 9, further comprising increasing the battery state of charge threshold in response to the automatic cranking time during a second engine start being greater than a second threshold amount of time via the controller and deactivating automatically stopping and starting the engine in response to the automatic cranking time being greater than a third threshold amount of time, the third threshold amount of time greater than the second threshold amount of time.

11. The method of claim 10, further comprising reactivating automatically stopping and starting the engine in response to a cold cranking time that is less than a fourth threshold amount of time.

12. The method of claim 11, where decreasing the battery state of charge threshold includes decreasing the battery state of charge threshold a predetermined amount after each automatic engine start where the automatic cranking is less than the first threshold amount of time until the battery state of charge threshold is a predetermined state of charge.

13. The method of claim 9, further comprising inhibiting automatic stopping and starting of the engine in response to the battery state of charge being greater than the battery state of charge threshold, a battery temperature being greater than a battery temperature threshold, and an engine cranking time of an operator requested engine start being greater than a third threshold amount of time, the third threshold amount of time greater than a second threshold amount of time.

14. The method of claim 9, further comprising automatically starting the engine via a first electric machine and a second electric machine in response to the battery state of charge being less than the battery state of charge threshold.

15. The method of claim 14, where the first electric machine is a low voltage starter and where the second electric machine is a driveline integrated starter/generator.

16. A system, comprising:
an engine;
a starter coupled to the engine; and
a controller including executable instructions stored in non-transitory memory to decrease a battery state of charge threshold in response to an automatic cranking time being less than a first threshold amount of time, and instructions to automatically stop and start the engine in response to a battery state of charge being greater than the battery state of charge threshold via the controller.

17. The system of claim 16, further comprising additional instructions to inhibit automatic stopping and starting of the engine in response to the battery state of charge being greater than the battery state of charge threshold, a battery temperature being greater than a battery temperature threshold, and an engine cranking time of an operator requested engine start being greater than a second threshold amount of time, the second threshold amount of time greater than the first threshold amount of time.

18. The system of claim 16, further comprising additional instructions to increase the battery state of charge threshold in response to the automatic cranking time being greater than a second threshold amount of time via the controller.

19. The system of claim 16, where the controller automatically starts the engine via the starter.

20. The system of claim 16, further comprising an integrated starter/generator, and where the controller automatically starts the engine via the integrated starter/generator.

* * * * *